(12) United States Patent
Stehr

(10) Patent No.: US 8,281,582 B2
(45) Date of Patent: Oct. 9, 2012

(54) METHOD FOR SUPPLYING A FLUID TO A TRANSMISSION COMPONENT

(75) Inventor: Reinhard Stehr, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 976 days.

(21) Appl. No.: 12/315,975

(22) Filed: Dec. 6, 2008

(65) Prior Publication Data
US 2009/0165453 A1    Jul. 2, 2009

Related U.S. Application Data

(60) Provisional application No. 61/005,627, filed on Dec. 6, 2007.

(51) Int. Cl.
*F16D 31/02* (2006.01)

(52) U.S. Cl. .......................................................... 60/327

(58) Field of Classification Search ..................... 60/327
See application file for complete search history.

(56) References Cited

U.S. PATENT DOCUMENTS 3,600,106 A * 8/1971 Baits et al. ..................... 475/77
\* cited by examiner

*Primary Examiner* — Michael Leslie
(74) *Attorney, Agent, or Firm* — Alfred J. Mangels

(57) ABSTRACT

A method for supplying fluid to a transmission component such as a transmission control unit, a transmission lubricating system, and/or a transmission cooling system. The transmission is an automatic transmission of a motor vehicle having a hydraulic actuating system. A hydraulic medium is drawn from a region within the interior of a transmission case by a positive displacement pump, and the region of the transmission case from which the positive displacement pump draws the hydraulic medium is subjected to an overpressure that is somewhat greater than the ambient pressure around the transmission case.

10 Claims, 1 Drawing Sheet

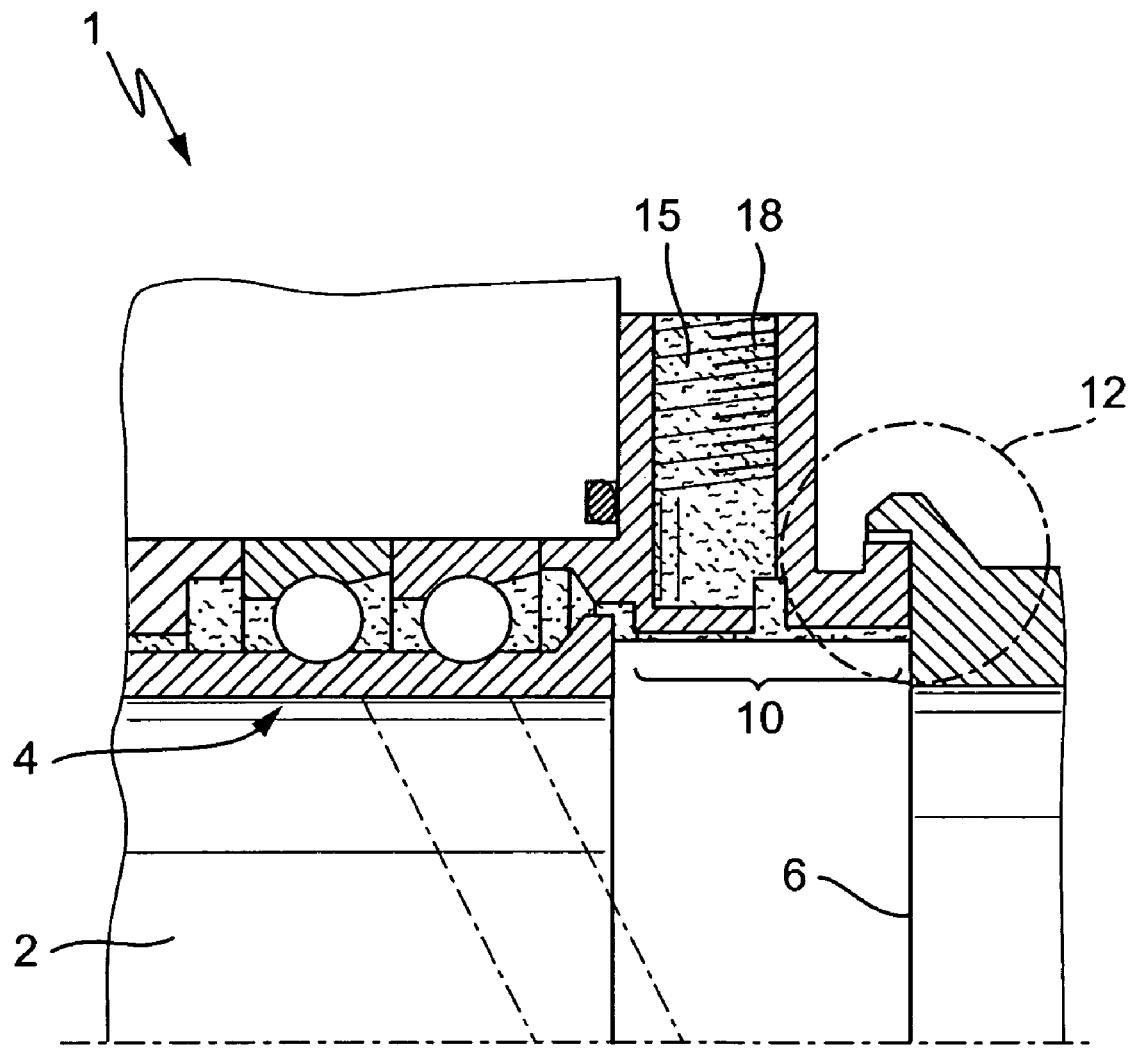

METHOD FOR SUPPLYING A FLUID TO A TRANSMISSION COMPONENT

BACKGROUND OF THE INVENTION

1. Field of the Invention

The present invention relates to a method for supplying a transmission component, such as a transmission control unit, a transmission lubricating system, and/or a transmission cooling system, in particular of an automatic transmission of a motor vehicle having a hydraulic actuating system, with a hydraulic medium that is drawn from a region within the interior of a transmission case by a positive displacement pump.

2. Description of the Related Art

The interiors of conventional transmission cases are in communication with the atmosphere through ventilation and air extraction systems, so that ambient pressure always exists within the interior of the transmission cases.

An object of the present invention is to avoid cavitation in a positive displacement pump that is used for supplying a transmission component, such as a transmission control unit, a transmission lubricating system, and/or a transmission cooling system of a transmission, in particular in an automatic transmission of a motor vehicle having a hydraulic actuating system, with hydraulic medium that is drawn from a region within the interior of a transmission case by a positive displacement pump.

SUMMARY OF THE INVENTION

Briefly stated, in accordance with one aspect of the present invention, the object is achieved by a method for supplying a transmission component, such as a transmission control unit, transmission lubricating system, and/or transmission cooling system of a transmission, in particular of an automatic transmission of a motor vehicle having a hydraulic actuating system, with hydraulic medium that is drawn from a region within the interior of a transmission case by a positive displacement pump. The region of the transmission case from which the positive displacement pump draws hydraulic medium is subjected to an overpressure that is somewhat greater than the ambient pressure of the transmission case. Cavitation can be reliably prevented in the positive displacement pump by the slight overpressure. Moreover, cavitation is avoided at orifices and orifice-like cross sections with outflows at sump pressure level that might cause unwanted restriction of their throughput. The overpressure can be fed into the interior region of the transmission case from outside at any location desired, in the form of a gas at a predetermined pressure.

The term cavitation refers to the formation and subsequent sudden condensation of vapor bubbles in flowing liquids. Cavitation is caused by changes in velocity, for example, and undesired mechanical destruction of the adjacent material can occur in the vicinity of cavitation regions.

A preferred exemplary embodiment of the method in accordance with the present invention is characterized in that the interior of the entire transmission case is subjected to an overpressure that is somewhat greater than the ambient pressure surrounding the transmission case. The region of the transmission case from which the positive displacement pump draws the hydraulic medium is then also affected.

Another preferred exemplary embodiment of the method in accordance with the present invention is characterized in that the overpressure is between 100 and 1000 millibars. The overpressure is preferably several hundred millibars.

Another preferred exemplary embodiment of the method in accordance with the present invention is characterized in that the overpressure is produced by an overpressure source within the vehicle. Preferably, an overpressure that is otherwise not needed in the vehicle is used.

Another preferred exemplary embodiment of the method in accordance with the present invention is characterized in that the overpressure is produced by the output of a vacuum pump. In diesel vehicles, for example, a vacuum pump is used to subject a brake booster to underpressure.

Another preferred exemplary embodiment of the method in accordance with the present invention is characterized in that a turbocharger pressure or engine exhaust gas pressure is used to produce the overpressure. If necessary, a valve is provided that ensures the desired transmission pressure.

Other preferred exemplary embodiments of the method in accordance with the present invention are characterized in that a gas or air is fed to the transmission case, in particular filtered air, which gas or air is at a predetermined pressure level.

Another preferred exemplary embodiment of the method in accordance with the present invention is characterized in that sealing air fed to the transmission case is used to produce the overpressure within the transmission case. The term sealing air refers to air that is intentionally fed to a sealing air arrangement in order to prevent unwanted entry of soil and escape of oil in the region of the sealing air arrangement.

Another preferred exemplary embodiment of the method in accordance with the present invention is characterized in that a transmission vent valve is provided on the transmission case, which valve opens only when the desired overpressure within the transmission case has been reached. That enables the overpressure within the transmission case, or the particular region of the transmission case, to be maintained in a simple manner.

BRIEF DESCRIPTION OF THE DRAWING

The structure, operation, and advantages of the present invention will become further apparent upon consideration of the following description, taken in conjunction with the accompanying drawing in which FIG. 1 shows in cross section an embodiment of the present invention in the form of a detail of a portion of a transmission case having a sealing air system.

DESCRIPTION OF THE PREFERRED EMBODIMENTS

A detail of a portion of a transmission case 1 with a sealing air system is shown in cross section in the accompanying drawing FIG. 1. A spindle 2 is rotatably supported in transmission case 1 by a bearing 4. An extension 6 that is surrounded by a sealing air arrangement 10 is provided on the spindle 2. The sealing air arrangement 10 serves to prevent the entry of soil and the escape of oil at an entry region 12 of transmission case 1. For that purpose, sealing air arrangement 10 is exposed to sealing air 18, which is shown by a dotted pattern, through a sealing air supply channel 15.

In accordance with an important aspect of the present invention, the sealing air 18 that flows through sealing air arrangement 10 into the interior of transmission case 1 is used to build up an internal pressure or overpressure within transmission case 1. The buildup of the internal pressure or overpressure within transmission case 1 is ensured by a case air pressure relief valve (not shown) that does not open until the desired internal pressure or overpressure within the transmission case is reached. As soon as the desired internal pressure is reached in transmission 1 case 1, excess air is able to escape from transmission case 1 through the case air pressure relief valve.

In accordance with another aspect of the present invention, sealing air arrangements are used to replace contact-type rotary shaft seals.

In investigations conducted in conjunction with the present invention it was found that the output of positive displacement pumps cannot be enlarged at will, at a given rotational speed, without reaching a point at some time when the displacement chambers are no longer completely filled, which can result in the occurrence of cavitation. Likewise, for the same reason, for a given pump size the speed of rotation of the pump cannot be increased at will through the use of other pump transmission ratio steps. For large volumetric flow requirements, that limitation can result in the need for additional pumps or additional pump flows.

The core of the present invention is to place under a slight internal overpressure the entire transmission case, or at least the region from which the positive displacement pump, which is preferably in the form of a hydraulic pump, draws fluid. It has been found that an overpressure of even a few hundred millibars contributes to preventing cavitation in the pump.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for supplying with hydraulic medium at least one of a transmission control unit, a transmission lubricating system, and a transmission cooling system of a transmission for a motor vehicle, having a hydraulic actuating system, said method comprising the steps of: drawing hydraulic medium from a region within the interior of a transmission case by a positive displacement pump; and subjecting the region of the transmission case from which the positive displacement pump draws hydraulic medium to an overpressure that is greater than the ambient pressure around the transmission case.

2. A method in accordance with claim 1, wherein the interior of the entire transmission case is subjected to an overpressure that is greater than the ambient pressure around the transmission case.

3. A method in accordance with claim 1, wherein the overpressure is between 100 and 1000 millibars.

4. A method in accordance with claim 1, including the step of producing the overpressure by an overpressure source within the motor vehicle.

5. A method in accordance with claim 1, including the step of producing the overpressure by the output of a vacuum pump.

6. A method in accordance with claim 1, including the step of producing the overpressure by at least one of a turbocharger output pressure and an engine exhaust gas pressure.

7. A method in accordance with claim 1, including the step of producing the overpressure by feeding a gas that is at a predetermined pressure to the transmission case.

8. A method in accordance with claim 1, including the step of producing the overpressure by feeding filtered pressurized air to the transmission case.

9. A method in accordance with claim 1, including the step of producing the overpressure by feeding to the transmission case sealing air from a transmission sealing air arrangement.

10. A method in accordance with claim 1, including the step of providing on the transmission case a transmission vent valve that does not open until a predetermined overpressure is reached within the transmission case.

* * * * *